United States Patent Office 3,455,607
Patented July 15, 1969

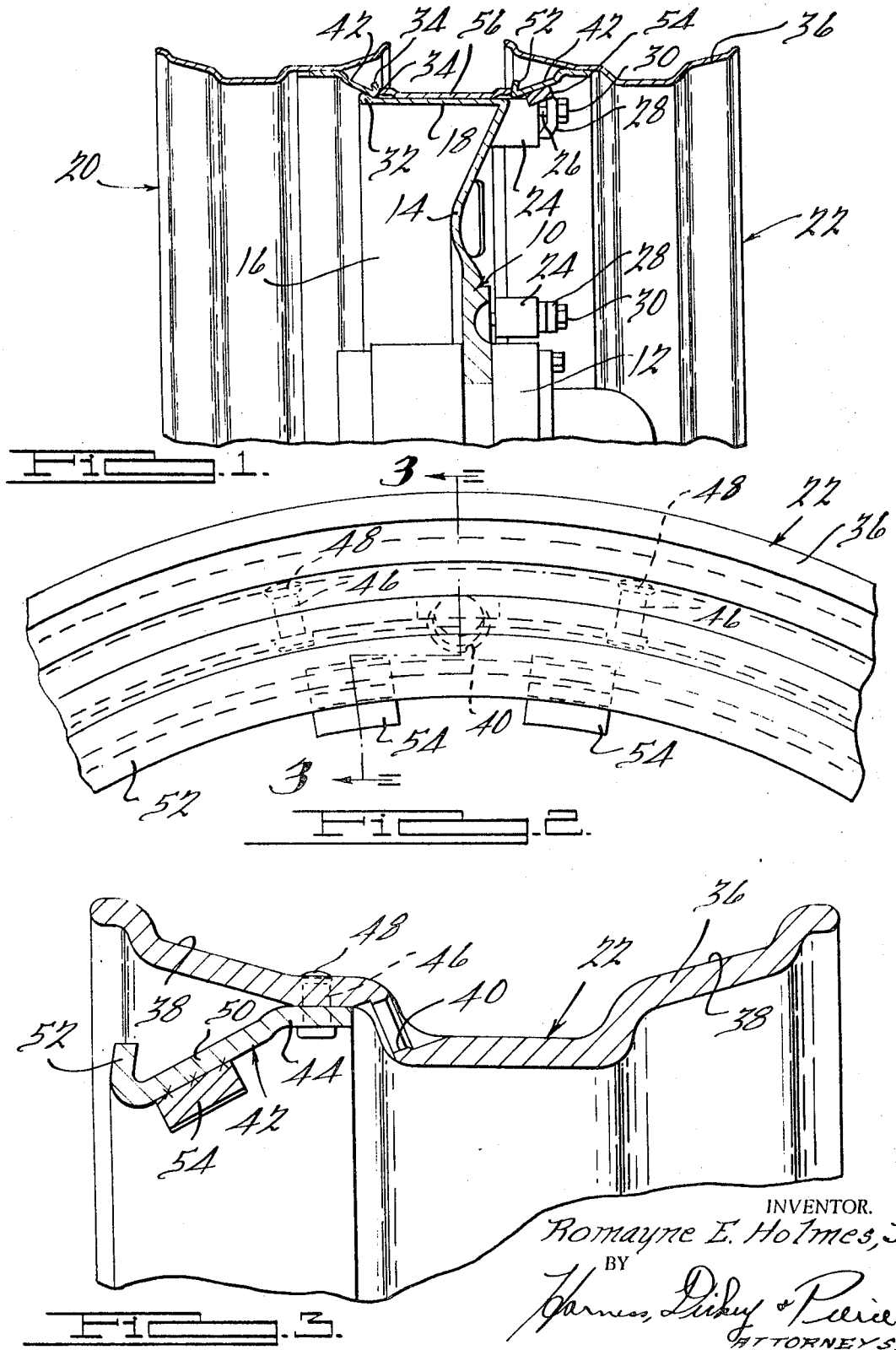

3,455,607
DEMOUNTABLE RIM WHEEL CONSTRUCTION
Romayne E. Holmes, Jr., Madison Heights, Mich., assignor to Kelsey-Hayes Company, a corporation of Delaware
Filed June 9, 1967, Ser. No. 645,033
Int. Cl. B60b 23/00
U.S. Cl. 301—13                    3 Claims

ABSTRACT OF THE DISCLOSURE

A wheel assembly of the heavy-duty demountable dual-rim type consisting of a wheel body having a circular mounting wall on which a pair of composite tire rims are removably disposed and are retained in appropriate axially spaced clamped relationship thereon. Each composite tire rim comprises a rim portion of a concave configuration having annular seats along the side edges thereof for receiving the bead of a tire. The rim is formed of a light-weight metal, such as aluminum, and is affixed to a mounting ring of steel, which is rigidly secured to the inner surface of the rim and extends in overlying engaged relationship around the wheel body. One of the mounting rings is formed with engaging members overlying the side edges of a plurality of clamps on the wheel body preventing relative rotation between the tire rim and wheel body.

Background of the invention

There is a continuous emphasis in the manufacture of heavy-duty cargo and freight hauling vehicles to provide a construction which is of optimum strength, while at the same time is of the least possible weight. With this objective, various modifications have been made in truck body and chassis components which have resulted in a reduction in vehicle weight without a sacrifice in vehicle performance and durability, thereby increasing the efficiency of the vehicle for freight hauling purposes. Reductions in the weight of the unsprung chassis components additionally provide improvements in the handling and ride characteristics of trucks. In view of the foregoing, reductions in the weight of truck wheel assemblies is particularly advantageous due to the increased cargo carrying efficiency and improved road handling characteristics obtained. Such weight reductions, however, in heavy-duty truck wheel assemblies have been restricted due to the high structural strength requirements of such components preventing substantial changes without effecting a sacrifice in the performance and durability of such components.

In addition to weight considerations of truck components, there has also been a continuing emphasis on increasing the versatility and simplicity of such components in order to substantially simplify maintenance and periodic inspection thereof. One such simplification has been provided by wheel assemblies having demountable tire rims which can be readily removed from the wheel body, thereby substantially facilitating tire replacement. The demountable rim wheel construction is of particular advantage in connection with dual tire heavy-duty wheel assemblies in which a pair of tire rims are adapted to be removably mounted in axially spaced relationship on a wheel body. In view of the loads imposed on such tire rim constructions, it has heretofore been considered not feasible to effect substantial weight reductions in such wheel assemblies due to an expected sacrifice in wheel strength and durability.

In accordance with the composite tire rim construction of the wheel assembly comprising the present invention, a substantial reduction in weight of a demountable dual rim wheel is now feasible and which additionally provides for substantial advantages in road handling and ride characteristics of a vehicle.

Summary of the invention

The advantages and benefits of the present invention are achieved by a wheel assembly which includes a wheel body formed with a hub, to which a substantially cylindrical mounting wall is attached and is disposed concentrically relative to the axis of rotation of the wheel body. One edge of the mounting wall is formed with a radial bead that defines an annular engaging surface, while a series of circumferentially-spaced clamping members are removably affixed to the wheel body adjacent to the opposite edge of the mounting wall. A pair of tire rims of a composite construction, including a rim portion of a lightweight metal and a mounting ring rigidly affixed to the inner surface of the rim portion and composed of a high strength steel, are adapted to be mounted in axially spaced relationship on the mounting wall. The mounting ring is formed along its outer edge with an outwardly turned flange and when the rims are mounted on the wheel body, the flanges are disposed in respective engagement with the engaging surface along one edge of the mounting wall and the clamping members along the edge of the opposite edge of the mounting wall. A suitable spacer ring is disposed between the opposed flanges for transmitting the axial thrust of the clamping members and for maintaining the rims in appropriate axially spaced relationship. The mounting ring adjacent to the clamping members is provided with a plurality of engaging members therearound which are adapted to be disposed in engaging relationship with the side edges of the clamping members, thereby preventing relative rotation between the tire rim and wheel body.

Other benefits and advantages of the present invention will become apparent upon a reading of the description of the preferred embodiments taken in conjunction with the accompanying drawing.

Brief description of the drawing

FIGURE 1 is a fragmentary transverse sectional view through the upper portion of a demountable dual rim wheel assembly;

FIGURE 2 is a fragmentary side elevational view of a composite tire rim constructed in accordance with the preferred embodiments of the present invention and illustrating the locking members thereon; and FIGURE 3 is a transverse sectional view through the tire rim shown in FIGURE 2 and taken substantially along the line 3—3 thereof.

Description of the preferred embodiments

Referring now in detail to the drawing, a demountable dual rim wheel assembly, as best seen in FIGURE 1, comprises a wheel body 10 including a hub portion 12 adapted to be rotatably supported on an axle and a series of radially extending spokes including side walls 14 and an end wall 16. The radially extending side walls and end walls terminate and are integrally connected to a substantially cylindrical mounting wall 18 on which a pair of composite tire rims 20, 22 are adapted to be removably mounted. It will be understood that the substantially cylindrical mounting wall 18 for the purposes of the present invention may be of a continuous circular construction or, alternatively, can be a series of arcuate segments as defined by the radial end of each of the wheel spokes which are disposed at circumferentially-spaced increments. The term "mounting wall," accordingly, is used in the specification and subjoined claims to encompass both a continuous substantially cylindrical wall as in the case of disk-type wheel bodies, as well as a series of equally spaced arcuate walls characteristic of spoke-type wheel bodies.

The wheel body 10 is formed with a boss 24 at the radial outer portion of each of the spokes adjacent to the right-hand edge of the mounting wall 18, as viewed in FIGURE 1, in which a suitable stud 26 is threadably engaged for removably securing a dish-shaped clamping member 28 by means of a nut 30. The peripheral surface of the mounting wall 18 opposite to the edge at which the clamping members 28 are disposed is formed with an enlarged bead 32 defining an angular engaging surface 34 for the purposes subsequently to be described.

Referring now in particular to FIGURES 2 and 3 of the drawing, the composite tire rim 22 consists of a circular rim 36 formed with a concave periphery of a configuration typical of a drop center rim. The side edges of the rim 36 are formed with angularly extending flat portions, indicated at 38, which define seats for supporting the beads of a tire (not shown) on the rim. The center dished portion of the rim 36 is also formed with an aperture 40 therethrough, through which the tire stem is adapted to extend. The rim 36 is composed of a high strength light-weight metal, such as aluminum alloy or magnesium, and is of a thickness sufficient to provide appropriate strength of the rim.

A mounting ring 42 of high strength steel is affixed to the inner surface of the light-weight metal rim 36, as best seen in FIGURE 3, and projects axially of one side thereof. The mounting ring 42 is formed with a circular, substantially cylindrical portion 44 which is adapted to be disposed in firm abutting contact against the inner surface of the rim adjacent to the drop center portion thereof and is rigidly affixed thereto by means of a plurality of rivets 46 at circumferentially-spaced intervals therearound. As will be noted in FIGURES 2 and 3, the head portions 48 of the rivets are substantially flush with the inner surface of the rim 36 so as to avoid any conflict with the tire bead during installation and removal of a tire from the rim.

The mounting ring 42 is formed with a conical wall 50 which extends in converging relationship and is provided along the outer end portion thereof with an outwardly turned flange 52. The inner surface of the mounting ring adjacent to its outer end portion and the outwardly turned flange 32 is of a diameter corresponding substantially to that of the periphery of the mounting wall 18 of the wheel body, as shown in FIGURE 1, providing a clearance fit of the mounting ring thereover.

The composite tire rim 20 is of an identical construction as that of the composite tire rim 22 with the exception that the composite tire rim 22 further includes engaging blocks 54 which are disposed in pairs and are rigidly affixed such as by welding to the inner surface of the conical wall 50 of the mounting rim. The engaging blocks 54 are positioned at intervals corresponding to the arcuate intervals of the bosses 24 along the wheel body and are adapted to overlie the side edges of the bosses and the clamping member 28 serving as stop or locking means so as to prevent relative rotation between the wheel body and the composite tire rim.

The composite tire rims 20 and 22 are maintained in appropriate axially spaced clamped relationship by means of a spacer ring 56, as best seen in FIGURE 1, which encircles the mounting wall 18 and is adapted to be disposed with the side edges thereof in firm clamping and abutting relationship against the opposed outwardly turned flanges 52 of the composite tire rims.

During installation of the demountable rims on the wheel body, the clamping members 28 are removed by unscrewing the nut 30 and the spacer ring 56 similarly is removed from the wheel body. The composite tire rim 20 is first slidably disposed over the mounting wall and is moved axially until the lower end portion of the conical wall 50 engages the engaging surface 34 as defined by the annular bead 32 along the edge of the mounting wall. Thereafter, the spacer ring 56 is placed in sliding relationship around the mounting wall and the composite tire rim 22 is placed in encircling relationship in a position as illustrated in FIGURE 1. The composite tire rim 22 is oriented such that the engaging blocks 54 thereon are disposed in straddling relationship relative to the bosses 24 on the wheel body and then the clamping members 28 are secured by means of the nuts at each location around the wheel body. As the nut 30 is tightened on the stud 26, the upper or clamping surface of the clamping ring 28, as viewed in FIGURE 1, engages the inner surface of the conical wall 50 of the mounting ring, effecting axial movement of the tire rim 22 toward the left as viewed in FIGURE 1. This axial clamping thrust is in turn transmitted through the spacer ring 56 to the tire rim 20 whereupon its mounting ring becomes firmly seated against the engaging surface 34. The removal of the tire rims is simply achieved by reversing the aforementioned steps.

It will be apparent from the foregoing construction that the composite tire rim of the wheel assembly of the present invention provides for a substantial reduction in the weight of the wheel, while at the same time providing the requisite strength, toughness and resistance to deformation and brinelling by virtue of the high strength steel mounting ring which is disposed in direct engagement with the wheel body.

While it will be apparent that the description of the preferred embodiments disclosed herein is well calculated to provide the advantages and benefits above stated, it will be appreciated that the invention is susceptible to modification, variation and change without departing from the spirit of the invention.

What is claimed is:

1. A wheel assembly comprising a wheel body including a hub and a substantially cylindrical mounting wall disposed concentric to the axis of rotation of said wheel body, said wall formed with a radial bead along one edge thereof defining an engaging surface, a plurality of clamping members removably affixed to said wheel body having clamping surfaces disposed at arcuate intervals along the other edge of said wall, a pair of composite tire rims each comprising a rim of a light-weight metal selected from the group consisting of aluminum and magnesium alloys having annular seats around the periphery thereof for receiving the beads of a tire and a mounting ring of high strength steel rigidly affixed to the inner surface of said rim, said mounting ring including a conical wall having an edge portion terminating in an outwardly turned flange, said edge portion of said mounting ring of the pair of said tire rims adapted to be disposed in encircling relationship and engagement with said engaging surface and said clamping surfaces, respectively; a spacer ring disposed around said mounting wall and between the opposed said outwardly turned flanges of each said mounting ring for maintaining said tire rims in appropriate axially spaced and clamped relationship, and engaging means comprising steel blocks rigidly affixed to the inner surface of the mounting ring and projecting outwardly therefrom for overlying the side edges of said clamping members to prevent relative rotation between said tire rim and said wheel body.

2. The wheel assembly as defined in claim 1, wherein said mounting ring is affixed to said rim by means of a plurality of rivets having head portions disposed substantially flush with the inner surface of said rim.

3. The wheel assembly as defined in claim 1, wherein said rim is of a dropped-center type.

References Cited

UNITED STATES PATENTS

| | | | |
|---|---|---|---|
| 2,149,113 | 2/1939 | Buss | 301—12 |
| 2,439,881 | 4/1948 | Ash | 301—65 |
| 2,779,631 | 1/1957 | Powers | 301—13 |
| 2,874,997 | 2/1959 | Brink | 301—13 |
| 3,259,437 | 7/1966 | Malthaner | 301—12 |

RICHARD J. JOHNSON, Primary Examiner